March 13, 1951      W. J. BLESSING ET AL      2,544,978
MULTIPLE FUEL INTERNAL-COMBUSTION ENGINE
Filed Jan. 18, 1949
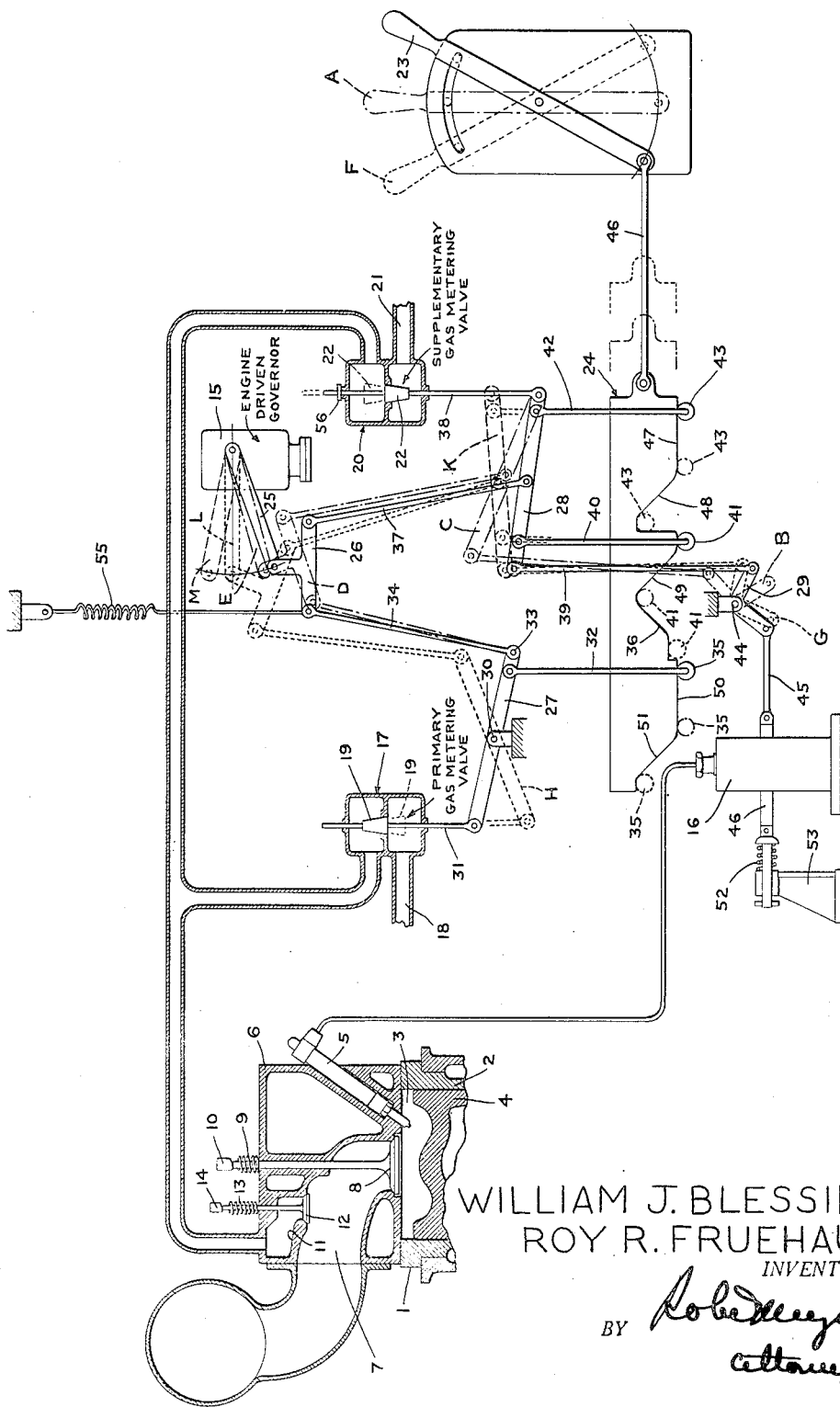
WILLIAM J. BLESSING
ROY R. FRUEHAUF
*INVENTORS*

Patented Mar. 13, 1951

2,544,978

UNITED STATES PATENT OFFICE 2,544,978

MULTIPLE FUEL INTERNAL-COMBUSTION ENGINE

William J. Blessing, Buffalo, and Roy R. Fruehauf, Orchard Park, N. Y., assignors to Worthington Pump and Machinery Corporation, Harrison, N. J., a corporation of Delaware Application January 18, 1949, Serial No. 71,478

14 Claims. (Cl. 123—27)

This invention relates to multiple fuel internal combustion engines and more particularly to an engine which will operate on either or both of two types of gas together with pilot oil fuel for ignition or it may be operated on oil fuel exclusively.

Many industrial plant processes generate gas which provides an economical source of gas fuel suitable for internal combustion engines, as for example in sewage plants wherein engines are operated on gas resulting from digestion of sewage. During operation the quantity of gas so generated fluctuates over time periods and at certain periods the available gas is insufficient to meet the fuel requirements of the engine or engines operated on such gas, and must be augmented by fuel from some other source of supply. Similar conditions are found where a steady given quantity of gas is available which is sufficient for certain operating loads of the engine but, when peak loads are required, the gas supply must be augmented.

Dual fuel engines suitable for operation on such gases wherein the augmenting fuel employed is oil and wherein the delivery of gas and air fuel mixture and the delivery of oil fuel to the engine is automatically controlled in accordance with the engine load and efficiencies of available gas fuel or made up by automatic control of the oil fuel are disclosed in Patents Nos. 2,400,219 and 2,400,247, issued May 14, 1946.

In many instances however, a secondary supply of gas fuel such as natural gas, is available and it is desirable to augment the fuel supply or make up deficiencies in the primary gas fuel available by gas fuel from the secondary or supplementary gas supply.

An object of the present invention is to provide a multiple fuel engine which will operate on gas fuel from either the primary or secondary gas supply or any combination of the two in which means are embodied for automatically controlling the amount of secondary gas used in the engine as a function of the amount of available primary gas fuel.

Another object of the present invention is to provide a multiple fuel engine having sufficient compression to operate as a compression ignition engine on oil fuel or as a high compression gas engine with the ignition effected by a small injection of fuel oil, commonly known as pilot injection, which engine to embody manually operated means for shifting from fuel oil operation to gas and when shifted to provide engine operation as a high compression gas engine with a mechanical means to limit the quantity of oil injected into the combustion chamber to the amount necessary to provide a pilot injection, to effect ignition of the gas fuel in the compression chamber, and also provide automatic control of the primary and secondary gas fuels supplied to the engine.

A further object of the invention is to provide in a multiple fuel engine, governor actuated means for automatically controlling the admission of a primary gas fuel and a supplemental gas fuel in amounts sufficient to supplement deficiencies in the primary gas fuel.

With these and other objects in view as may appear from the accompanying specification, the invention consists of various features of construction and combination of parts, which will be first described in connection with the accompanying drawing showing a diagrammatic and partial sectional view of an internal combustion engine in accordance with the present invention, and the features forming the invention will be specifically pointed out in the claims.

Referring more particularly to the drawing, 1 indicates a fragment of an internal combustion engine wherein the cylinder 2 contains the compression space 3 and in which the usual piston 4 reciprocates in the usual manner within the cylinder 2. An oil fuel injection nozzle 5 is incorporated in the head 6 of the cylinder 2 and is provided both for the injection of oil fuel into the compression space 3 when the engine operates as a Diesel oil engine and to inject pilot fuel for the ignition of gas in the compression space when the engine operates as a gas engine.

The head 6 has the gas fuel and air intake passage 7 therein communication of which with the compression space 3 is controlled by an intake valve 8. The intake valve 8 is of the usual type of intake valve employed in such engines, is held closed by a spring 9 and is opened by the operation of the usual type of rocker arm indicated at 10.

A gas supply passage 11 is also provided in the head 6, which gas passage opens into the air intake passage 7. Communication between the gas passage 11 and the intake air passage 7 is controlled by a gas timing valve 12 which is of the ordinary construction of poppet valve, held closed by a spring 13 and opened by operation of the usual type of rocker arm indicated at 14. An engine driven governor 15 of the usual construction is driven by the engine in the usual manner.

Diesel fuel or oil fuel is delivered to the spray valve 5 by a fuel injection pump 16 which may be of any approved construction but preferably of the type shown in patent applications, Serial No. 709,514 or Serial No. 21,246, and the control of this fuel pump will be specifically referred to hereafter in the description of the operation of the engine of the present invention.

Primary gas supply is delivered to a gas metering valve structure 17 from any suitable source through the intake 18 and its delivery to the gas passage 11, through suitable conduits, is controlled by a valve 19 in the metering valve structure 17. Secondary or supplementary gas is delivered to a gas metering valve structure 20 from any suitable supply source through the intake 21 and its delivery to the gas inlet passage 11 is controlled by a valve 22 incorporated in the gas metering valve structure 20. The supply of oil, either as the main fuel or as the pilot ignition fuel to the engine by the fuel injection pump 16 and the quantities of primary or supplementary gas delivered to the engine are under first manual control by means of a manually operated lever 23 and a cam 24 through a series of levers and arm connections and when the lever 23 is set for the engine to run as a high compression oil fuel injection gas engine the quantities of primary and supplementary gas delivered to the engine are under control of the engine driven governor 15 through a series of levers and connecting arms, all as will be specifically pointed out in the following description of the operation of the engine.

In operation of the engine: when the hand lever 23 is in the stop position as shown in the drawing the cam 24, levers 25, 26, 27, and 28, and the crank arm lever 29 are all in the positions shown in solid lines in the drawing.

The lever 25 is connected to the engine driven governor 15 and is moved by operation thereof. The lever 25 is in turn pivotally connected to the lever 26 intermediate its ends. The lever 26 is connected to the lever 27 at one end of this lever 27. The lever 27 is pivotally supported intermediate its ends as shown at 30 and has a link connection 31 with the valve 19 of the gas metering valve 17. A link or arm 32 is connected to the lever 27 near the pivotal point 33 of the connection of the link 34 therewith which link serves to connect the levers 26 and 27. The link or arm 32 has a roller 35 thereon, the perimeter of which rides over a part of the actuating surface or edge 36 of the cam 24. The lever 26 is connected to the lever 28 intermediate the ends of the latter lever by a link or arm 37. One end of the lever 28 is connected by a link 38 to the valve 22 of the supplementary gas metering valve 20, while the other end is connected by means of a link or arm 39 with the crank lever 29. An arm or link 40 is pivotally connected to the lever 28 between the end of the lever to which the link 39 is connected and the point on the lever to which the link 37 is connected. The link 40 has a roller 41 thereon, the perimeter of which rides upon part of the undulated roller actuating edge of the cam 24. A third arm 42 is connected to the lever 28 between the end to which the valve actuating link 38 is connected and the point at which the link 37 is connected to the lever. The link 42 has a roller 43 thereon which rides over part of the actuating edge of the cam 24.

The crank lever 29 which is pivotally supported intermediate its ends as shown at 44 is connected by a link 45 to the control shaft 46 of the fuel injection pump 16. The cam 24 is connected to the lever 23 by a suitable link 46.

When the lever 23 is moved to mid position indicated by the line A for operating the engine on oil fuel the roller 43 assumes the position indicated by the dot and dash lines, i. e., it engages the flat surface 47 of the operating edge of the cam 24 just short of the beginning of the inclined portion 48 of the cam and the roller 41 moves along the inclined portion 49 of the cam to its deepest position in the detent in the cam as shown by the dot and dash lines. The roller 35 moves along the flat surface 50 of the cam 24 just short of the beginning of the incline 51 of the cam surface. The roller 41 is then free to move under control of the engine driven governor 15 supplemented by the compression spring 52 of the spring loaded stop 53. At this time the crank lever 29 assumes the position indicated by the dot and dash line B while the lever 28 assumes the position indicated by the dot and dash line C; the lever 26 assumes the position indicated by the dot and dash line D and the governor actuated lever 25 shown in solid lines in the drawing moves when the engine is started towards the position indicated by the dot and dash line E. Fuel supply to the engine is, therefore under constant governor control for starting purposes or for continued operation of the engine on oil fuel exclusively.

When the hand control lever 23 is moved into the position indicated by the line F, i. e., into the gas running position, the roller 43 moves upwardly along the inclined surface 48 into its deepest position within the first indent of the cam 24, as shown in dotted lines, while the roller 41 moves downwardly or outwardly into the position indicated by dotted lines while the roller 35 moves along the incline 51 into the dotted position shown in the drawing. These movements release mechanism for actuating both of the gas metering valves 17 and 20 by means of the governor 15 and limits the oil fuel supply to pilot quantity since during such movement the crank lever 29 moves to the dotted line, position G, for operation on pilot oil only. The release of the mechanism for actuating both gas valves is accomplished by movement of the cam 24 through the various rollers and links to the respective levers 25, 26, 27, and 28, and when the cam is moved by the movement of the control lever 23 into the position F the levers 27 and 28 are free to move respectively into the dotted line, position H and the dash line position K.

Since it is the intention to utilize solely and completely the primary gas supply whenever it is available in sufficient quantity to meet the engine load requirements, and use the supplementary gas only when required to provide sufficient fuel to meet the engine load demands, a tension spring 55 is therefore attached to the lever 26 at the point where the link 34 is connected thereto. During operation of the engine at such tensioning of the various control levers the governor actuated lever 25 moves from the solid line position shown in the drawing towards the position indicated by the dotted line L and actuates the gas metering valve 17 only. If the supply of primary gas is not sufficient to supply the needs of the engine, the governor actuated lever 25 travels into the zone between the dotted line, position L, and the dash line, position M, moving levers 26 and 28 and actuating the supplementary gas metering valve 20 in a predetermined degree depending upon the degree of movement of the lever 25 in the zone between the line positions L and M, thus supplying only the amount of supplementary gas necessary to supplement the primary gas with sufficient fuel to meet the engine's demands. During such operation the crank lever 29 remains in the dotted line pilot oil supply position G and the lever 27 remains in the dotted line position H, being restrained from movement by the roller 35; the lever 28 fulcrums about its point of pivotal connection to the link 39 and moves towards the dash line position K, opening the valve 22 in degrees or increments controlled by movement of the lever 25 under control of the engine driven governor 15.

If sufficient primary gas is available the tension spring 55 will keep gas metering valve 22 in closed position against its stop 56 and the governor 15 will function entirely on the valve 17. If and when the governor actuated lever 25 moves into the zone between the lines L and M, the valve 19 of the gas metering valve structure 17 will have reached its maximum lift or open position and the valve 22 of the gas metering valve 20 will start to open.

With the linkage and various elements just described, either primary or supplementary gas is always completely under control of the engine driven governor 15 and the quantity of pilot oil delivered to the cylinder 2 for fuel ignition is fixed by restricting the roller 41 by means of the cam 24.

From the foregoing description, taken in connection with the accompanying drawing, it will be apparent that the engine of the present invention may be actuated wholly as an oil fuel or Diesel engine, or it may be operated as a dual gas fuel engine in which the supplies of primary and supplementary gas are automatically controlled as a function of the amount of available primary gas fuel that is under complete control of the engine driven governor so as always to supply the necessary fuel requirements to the engine as dictated by its load.

However, the engine is primarily designed to be first started on fuel oil only and then changed by movement of the control lever 23 for operation on gas fuel, at which time the fuel oil quantity delivered to the engine is mechanically limited to the minimum required for ignition of the gas fuel.

It will be understood that the invention is not to be limited to the specific construction or arrangement of parts shown, but that they may be widely modified within the invention defined by the claims.

What is claimed is:

1. In a multiple fuel engine of the internal combustion type, the combination, of a cylinder having a combustion chamber, means for delivering oil fuel to said combustion chamber, means for delivering a primary gas fuel to the combustion chamber, means for delivering a supplementary gas fuel to said combustion chamber, manually operable means whereby said oil and gas delivering means may be set to admit only oil to the combustion chamber for operation of the engine as a fuel injection compression ignition engine or, to admit gas fuel for operation of the engine as an oil ignition high compression gas engine, a valve for controlling delivery of primary gas fuel to the combustion chamber, a valve for controlling delivery of supplemental gas fuel to the combustion chamber, an engine driven governor, and means connecting said governor and said valves for automatically operating the valves to control delivery of gas fuel to the combustion chamber, said last-named means including a series of levers and links connected and arranged so that said supplementary gas delivery control valve will be open only in degrees to deliver supplementary gas in amounts sufficient to supplement deficiencies in available primary gas, a fuel pump for delivering oil fuel to the combustion chamber, a lever for adjusting said fuel pump to deliver oil fuel to the combustion chamber in sufficient quantity for operation of the engine as a fuel injection compression engine or to deliver a minimum quantity of oil fuel to the combustion chamber for ignition of gas fuel during operation of the engine as an oil ignition high compression engine.

2. In a multiple fuel engine of the internal combustion type, the combination, of a cylinder having a combustion chamber, means for delivering oil fuel to said combustion chamber, means for delivering a primary gas fuel to the combustion chamber, means for delivering a supplementary gas fuel to said combustion chamber, manually operable means whereby said oil and gas delivering means may be set to admit only oil to the combustion chamber for operation of the engine as a fuel injection compression ignition engine or, to admit gas fuel for operation of the engine as an oil ignition high compression gas engine, a valve for controlling delivery of primary gas fuel to the combustion chamber, a valve for controlling delivery of supplemental gas fuel to the combustion chamber, an engine driven governor, and means connecting said governor and said valves for automatically operating the valves to control delivery of gas fuel to the combustion chamber, said last-named means including a series of levers and links connected and arranged so that said supplementary gas delivery control valve will be open only in degrees to deliver supplementary gas in amounts sufficient to supplement deficiencies in available primary gas, a fuel pump for delivering oil fuel to the combustion chamber, a lever for adjusting said fuel pump to deliver oil fuel to the combustion chamber in sufficient quantity for operation of the engine as a fuel injection compression engine or to deliver a minimum quantity of oil fuel to the combustion chamber for ignition of gas fuel during operation of the engine as an oil ignition high compression engine, a link connecting said oil pump lever to one of said gas control valve operating levers whereby the fuel pump will be set for delivering an igition supply of oil fuel only to the combustion chamber when either of said gas fuel control valves are open.

3. In a multiple fuel engine of the internal combustion type, the combination, of a cylinder having a combustion chamber, means for delivering oil fuel to said combustion chamber including a fuel pump, means for delivering a primary gas fuel to the combustion chamber including a primary gas fuel supply control valve, means for delivering a supplementary gas fuel to the combustion chamber including a supplementary gas fuel supply control valve, a manually operable control lever, operative connections between said fuel pump, primary gas fuel control valve, supplementary gas fuel control valve and said manually operable lever for setting said fuel pump to supply oil fuel to the combustion chamber in sufficient quantity for operation of the engine as a fuel injection compression ignition engine and for holding said gas fuel control valves closed, and for adjusting said fuel pump to supply only an ignition quantity of oil fuel to the combustion chamber and releasing said gas fuel control valves for opening to supply gas fuel to the combustion chamber, means controlling operation of said gas fuel control valves whereby said supplementary gas fuel control valve will be operated to supply supplementary gas fuel to the combustion chamber in amounts to supplement deficiencies in available primary gas fuel supplied to the combustion chamber.

4. In a multiple fuel engine of the internal combustion type, the combination, of a cylinder having a combustion chamber, means for delivering oil fuel to said combustion chamber including a fuel pump, means for delivering a primary gas fuel to the combustion chamber including a primary gas fuel supply control valve, means for delivering a supplementary gas fuel to the combustion chamber including a supplementary gas fuel supply control valve, a manually operable control lever, operative connections between said fuel pump, primary gas fuel control valve, supplementary gas fuel control valve and said manually operable lever for setting said fuel pump to supply oil fuel to the combustion chamber in sufficient quantity for operation of the engine as a fuel injection compression ignition engine and for holding said gas fuel control valves closed, and for adjusting said fuel pump to supply only an ignition quantity of oil fuel to the combustion chamber and releasing said gas fuel control valves for opening to supply gas fuel to the combustion chamber, an engine driven governor, and means connecting said governor and said gas fuel control valves for automatically operating the valves to control delivery of gas fuel to the combustion chamber.

5. In a multiple fuel engine of the internal combustion type, the combination, of a cylinder having a combustion chamber, means for delivering oil fuel to said combustion chamber including a fuel pump, means for delivering a primary gas fuel to the combustion chamber including a primary gas fuel supply control valve, means for delivering a supplementary gas fuel to the combustion chamber including a supplementary gas fuel supply control valve, a manually operable control lever, operative connections between said fuel pump, primary gas fuel control valve, supplementary gas fuel control valve and said manually operable lever for setting said fuel pump to supply oil fuel to the combustion chamber in sufficient quantity for operation of the engine as a fuel injection compression ignition engine and for holding said gas fuel control valves closed, and for adjusting said fuel pump to supply only an ignition quantity of oil fuel to the combustion chamber and releasing said gas fuel control valves for opening to supply gas fuel to the combustion chamber, an engine driven governor, means connecting said governor and said gas fuel control valves for automatically operating the valves to control delivery of gas fuel to the combustion chamber, and means operated by operation of said manually operable control lever for setting said oil fuel pump to deliver to the combustion chamber only the minimum quantity of fuel oil required for ignition when the engine is operating as an oil ignition high compression gas engine.

6. The multiple fuel engine as claimed in claim 3 wherein said operative connections between said primary gas fuel control valve said supplementary gas fuel control valve and said manually operable control lever includes a series of levers and links connected and arranged so that said supplementary gas fuel control valve will be opened only in degrees to deliver supplementary gas in amounts sufficient to supplement deficiencies in available primary gas, said operative connection between said fuel pump and said manually operable control lever including a pivoted lever, a link connecting said pivoted oil pump lever to one of said gas fuel control valve operating levers whereby the fuel pump will be set for delivering an ignition supply of oil fuel only to the combustion chamber when either of said gas control valves are open.

7. The multiple gas engine as claimed in claim 3 wherein said operative connections between said primary gas fuel control valve said supplementary gas fuel control valve and said manually operable control lever includes a series of levers and links connected and arranged so that said supplementary gas fuel control valve will be opened only in degrees to deliver supplementary gas in amounts sufficient to supplement deficiencies in available primary gas, said operative connection between said fuel pump and said manually operable control lever including a pivoted lever, a link connecting said pivoted oil pump lever to one of said gas fuel control valve operating levers whereby the fuel pump will be set for delivering an ignition supply of oil fuel only to the combustion chamber when either of said gas control valves are open, a cam connected to said manually operable control lever and shifted thereby, and a plurality of cam rollers engaging said cam and connected to certain of said links whereby said levers will be positively and simultaneously shifted to their respective proper positions for operation of the engine on either oil fuel or gas fuel.

8. In a multiple fuel engine of the internal combustion engine type, the combination, of a cylinder having a combustion chamber, means for delivering oil fuel to said combustion chamber, means for delivering a primary gas fuel to the combustion chamber, means for delivering a supplementary gas fuel to said combustion chamber, manually operable means whereby said oil and gas delivery means may be set to admit only oil to the combustion chamber for operation of the engine as a fuel injection compression ignition engine or, to admit gas fuel for operation of the engine as an oil ignition high compression gas engine, a valve for controlling delivery of primary gas fuel to the combustion chamber, a valve for controlling delivery of supplemental gas fuel to the combustion chamber, an engine driven governor, articulated lever connections between said engine governor and said primary gas delivery control valve and said supplementary gas delivery control valve and between the valves, said articulated lever connections arranged and connected whereby when said supplementary gas control valve is opened to any degree said primary gas control valve will be in full open position.

9. In a multiple fuel engine of the internal combustion engine type, the combination, of a cylinder having a combustion chamber, means for delivering oil fuel to said combustion chamber, means for delivering a primary gas fuel to the combustion chamber, means for delivering a supplementary gas fuel to said combustion chamber, manually operable means whereby said oil and gas delivery means may be set to admit only oil to the combustion chamber for operation of the engine as a fuel injection compression ignition engine or, to admit gas fuel for operation of the engine as an oil ignition high compression gas engine, a valve for controlling delivery of primary gas fuel to the combustion chamber, a valve for controlling delivery of supplemental gas fuel to the combustion chamber, an engine driven governor, articulated lever connections between said engine governor and said primary gas delivery control valve and said supplementary gas delivery control valve and between the valves, said articulated lever connections arranged and connected whereby when said supplementary gas control valve is opened to any degree said primary gas control valve will be in full open position, said manually operable means operable to move certain of said articulated lever connections to prevent opening of said gas controlled valves when the engine is operating as a fuel injection compression ignition engine.

10. In a multiple fuel engine of the internal combustion engine type, the combination, of a cylinder having a combustion chamber, means for delivering oil fuel to said combustion chamber, means for delivering a primary gas fuel to the combustion chamber, means for delivering a supplementary gas fuel to said combustion chamber, manually operable means whereby said oil and gas delivery means may be set to admit only oil to the combustion chamber for operation of the engine as a fuel injection compression ignition engine or, to admit gas fuel for operation of the engine as an oil ignition high compression gas engine, a valve for controlling delivery of primary gas fuel to the combustion chamber, a valve for controlling delivery of supplemental gas fuel to the combustion chamber, an engine driven governor, articulated lever connections between said engine governor and said primary gas delivery control valve and said supplementary gas delivery control valve and between the valves, said articulated lever connections arranged and connected whereby when said supplementary gas control valve is opened to any degree said primary gas control valve will be in full open position, means connecting said articulated lever connections with said oil fuel delivery means whereby when said gas controlled valves are subject to opening by operation of the governor and said engine is operating as an oil ignition high compression gas engine said oil fuel delivery means will be set to supply only an ignition oil charge to the combustion chamber.

11. In a multiple fuel engine of the internal combustion engine type, the combination, of a cylinder having a combustion chamber, means for delivering oil fuel to said combustion chamber, means for delivering a primary gas fuel to the combustion chamber, means for delivering a supplementary gas fuel to said combustion chamber, manually operable means whereby said oil and gas delivery means may be set to admit only oil to the combustion chamber for operation of the engine as a fuel injection compression ignition engine or, to admit gas fuel for operation of the engine as an oil ignition high compression gas engine, a valve for controlling delivery of primary gas fuel to the combustion chamber, a valve for controlling delivery of supplemental gas fuel to the combustion chamber, an engine driven governor, articulated lever connections between said engine governor and said primary gas delivery control valve and said supplementary gas delivery control valve and between the valves, said articulated lever connections arranged and connected whereby when said supplementary gas control valve is opened to any degree said primary gas control valve will be in full open position, means connecting said articulated lever connections with said oil fuel delivery means whereby when said gas controlled valves are subject to opening by operation of the governor and said engine is operating as an oil ignition high compression gas engine said oil fuel delivery means will be set to supply only an ignition oil charge to the combustion chamber, said manually operable means operable to move certain of said articulated lever connections to prevent opening of said gas control valves when the engine is operating as a fuel injection compression ignition engine.

12. A multiple fuel internal combustion engine as claimed in claim 8 wherein said manually operable means includes a non-rotating shiftable cam having undulated cam surfaces, cam rollers for movement over said undulated surface, and means connecting said cam rollers to certain of the levers in said articulated lever connections for setting the lever connections to provide operation of the engine either as a fuel injection compression ignition engine or as an oil ignition high compression gas engine.

13. A multiple fuel internal combustion engine as claimed in claim 9 wherein said manually operable means includes a non-rotating shiftable cam having undulated cam surfaces, cam rollers for movement over said undulated surface, and means connecting said cam rollers to certain of the levers in said articulated lever connections for setting the lever connections to provide operation of the engine either as a fuel injection compression ignition engine or as an oil ignition high compression gas engine.

14. A multiple fuel internal combustion engine as claimed in claim 11 wherein said manually operable means includes a non-rotating shiftable cam having undulated cam surfaces, cam rollers for movement over said undulated surface, and means connecting said cam rollers to certain of the levers in said articulated lever connections for setting the lever connections to provide operation of the engine either as a fuel injection compression ignition engine or as an oil ignition high compression gas engine.

WILLIAM J. BLESSING.
ROY R. FRUEHAUF.

REFERENCES CITED

The following references are of record in the file of this patent:

UNITED STATES PATENTS

| Number | Name | Date |
| --- | --- | --- |
| 1,833,265 | Schmidt | Nov. 24, 1931 |
| 1,858,824 | Heidelberg | May 17, 1932 |
| 2,400,219 | Barnaby et al. | May 14, 1946 |
| 2,400,247 | Miller et al. | May 14, 1946 |